US009242451B2

(12) United States Patent
Rebora

(10) Patent No.: US 9,242,451 B2
(45) Date of Patent: Jan. 26, 2016

(54) PRINTING MODULE

(71) Applicant: Prima S.r.l., Milan (IT)

(72) Inventor: Francesco Rebora, Milan (IT)

(73) Assignee: PRIMA S.r.l. (IT)

( * ) Notice: Subject to any disclaimer, the term of this patent is extended or adjusted under 35 U.S.C. 154(b) by 0 days.

(21) Appl. No.: 14/264,933

(22) Filed: Apr. 29, 2014

(65) Prior Publication Data

US 2014/0319753 A1 Oct. 30, 2014

(30) Foreign Application Priority Data

Apr. 30, 2013 (IT) .............................. TO2013A0351

(51) Int. Cl.
*B32B 3/06* (2006.01)
*B41F 19/00* (2006.01)
*B42B 5/10* (2006.01)

(52) U.S. Cl.
CPC . *B41F 19/00* (2013.01); *B42B 5/10* (2013.01); *B42P 2241/22* (2013.01)

(58) Field of Classification Search
CPC .... B42B 5/10; Y10T 428/14; Y10T 428/1495
USPC .................................................. 428/43, 40.1
See application file for complete search history.

(56) References Cited

U.S. PATENT DOCUMENTS 4,749,427 A 6/1988 Pitts

FOREIGN PATENT DOCUMENTS

WO 0040426 7/2000
WO 2004028826 4/2004

*Primary Examiner* — Alexander Thomas
(74) *Attorney, Agent, or Firm* — The Belles Group, P.C.

(57) ABSTRACT

A printing module comprising a support and a self-adhesive rectangular sheet element having a first face coated with adhesive and arranged on the support and a second face configured to receive signs (PRT) by means of priming. The sheet element having preferential breaking lines which delimit a sheet binding element comprising: a rectangular element and a plurality of flexible tabs arranged as a comb which integrally extend along a first lamer side of the rectangular element.

8 Claims, 4 Drawing Sheets

PRINTING MODULE

CROSS REFERENCE TO RELATED APPLICATIONS

This application claims priority under 35 U.S.C. §119 to Italian Patent Application No. TO2013A000351, filed Apr. 30, 2013, the entirety of which is hereby incorporated by reference.

BACKGROUND OF THE INVENTION

As is known, in order to bind sheets arranged in a pack and perforated along a perimeter edge of the pack, binding devices are used having substantially tubular conformation comprising an elongated edge having a substantially C-shaped transversal section and a plurality of curved flexible tabs obtained integrally with the portion of edge and arranged spaced apart from each other to form an elastic structure shaped as a comb. Each of said tabs is adapted to be inserted in a respective hole (preferably rectangular in shape) of the pack to cross the pack and be arranged with the end portion thereof abutting against an inner surface of the edge portion, thus making a stable connection between the sheets which are bound to form a booklet.

The above-described, binding devices of known type have a plurality of drawbacks, including:

the elongated end portion protrudes frontally and laterally from the booklet; for such a reason, it is often difficult to arrange the booklet on a shelf or put it near other bound booklets;

there is a need for binding devices having different dimensions, in particular different size and shape of the elongated edge portion, in order to bind booklets having different thickness;

it is not generally possible to print text and words by means of priming on the bound booklet because such an area is formed by the outer surface of the edge portion which is bent and is made of plastic material; and the binding device (made of plastic material) is to he separated from the sheets of the pack should there be a need to dispose of the booklet, for example burn it.

SUMMARY OF THE INVENTION

It is the object of the present invention to make as device for binding sheets arranged in a pack which solves the drawbacks of known devices, and in particular allows text and words to be printed also on the comb of the bound booklet by means of printer.

The preceding object is achieved by the present invention because it relates to a printing module comprising a support and a self-adhesive sheet element having a first face coated with adhesive and arranged on said support and a second face configured to receive signs by means of printing, characterized in that said sheet element has preferential breaking lines which delimit a sheet binding element comprising: a rectangular element; a plurality of flexible tabs arranged as a comb which integrally extend along a first larger side of the rectangular element; the binding element being separable from said support and being configured to be used with a pack of sheets provided with overlapped through-holes made along one side of each sheet; said tabs being configured to be inserted in respective through-holes with an end of the tabs which protrudes from the holes and is folded and lying on a first lace of said pack; said rectangular element being foldable and arranged with at least a portion of second larger side thereof opposite to the first side overlapped on said folded tabs and stably connected with said first face and with said tabs by means of said adhesive to form a bound booklet.

BRIEF DESCRIPTION OF THE DRAWINGS

The invention will now be described with reference to the accompanying drawings, which illustrate a non-limiting exemplary embodiment thereof, in which.

DETAILED DESCRIPTION OF THE INVENTION

Figure 1:
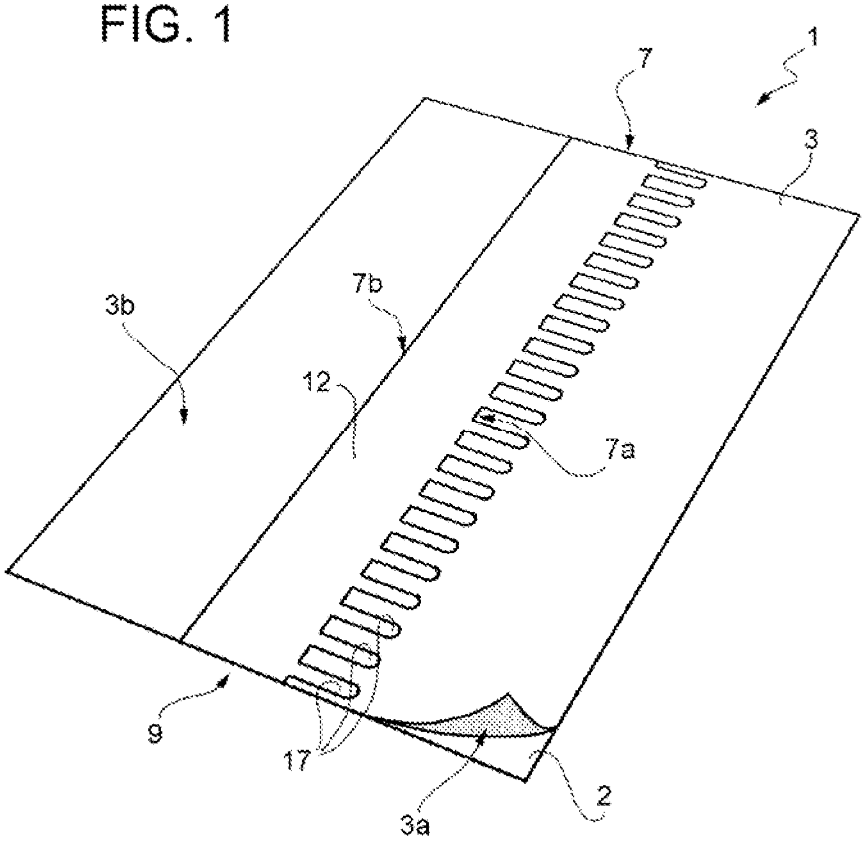
FIG. 1 shows a perspective view of a printing module made according to the dictates of the present invention.
Figure 1A:
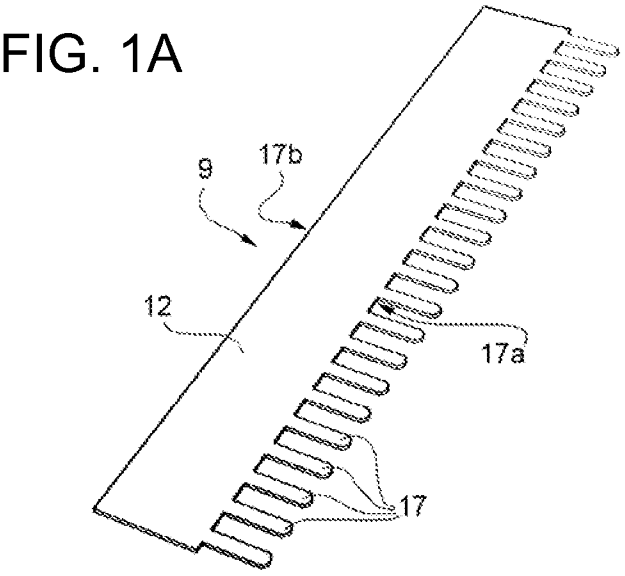
FIG. 1A shows a perspective view of a sheet binding element of the module.

Numeral 1 in FIG. 1 indicates a printing module as a whole, comprising a rectangular sheet support 2 (made of anti-adhesive plastic material) and a self-adhesive rectangular sheet element 3 having a first face 3-*a* coated with adhesive and arranged in contact with support 2 and a second face 3-*b* configured to receive signs by means of printing (typically the second face is white).

In particular, the format of the printing module 1 (dimensions and thicknesses) are compatible with those of commonly used printers in such a manner that module 1 may be used with a printer that prints text, drawings, symbols, or other (colour or black & white) on the second face 3-*b*.

According to the present invention, the sheet element has preferential breaking lines 7 which delimit a sheet binding element 9 comprising:

a rectangular element 12;

a plurality of flexible tabs 17 arranged as a comb which integrally extend along a first larger side 17-*a* of the rectangular element 12.

In particular, the preferential breaking lines 7 comprise a first rectilinear line 7-*b* which extends for the whole length of said self-adhesive element 3 and delimits a second larger side 17*b* of element 12 and a second breaking line 7-*a* formed by rectilinear stretches belonging to the first side 17-*a* and alternating with U-shaped stretches which delimit respective tabs 17.

In use, the printing module is arranged in a printer which prints on the first face 3-*b*. The signs may therefore be printed on the portion of the first face which delimits the rectangular element 12 and/or the tabs 17.

The binding element is then manually separated from support 2 (FIG. 1) because the breaking lines 7-*a* and 7-*b* open thus defining edges of the binding element 9 which comprises the rectangular element 12 and the flexible tabs 17 arranged as a comb which extend integrally along the first larger side 17-*a* of the rectangular element 12.

Figure 2:
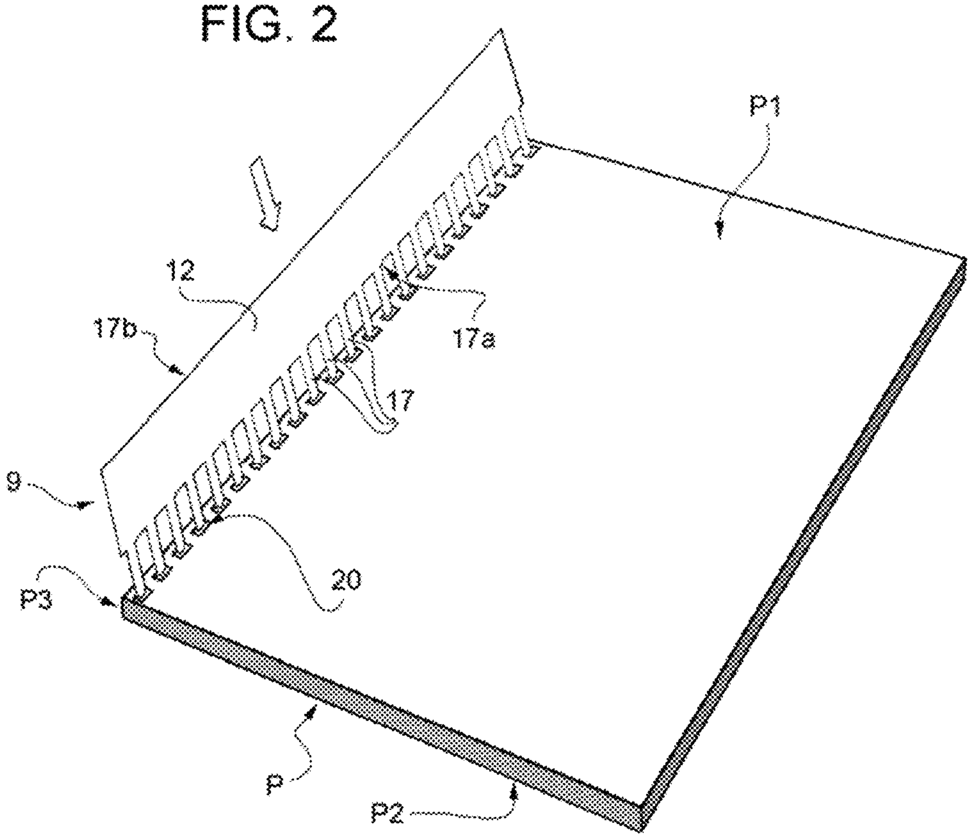
FIG. 2 shows a perspective view in enlarged scale, of a first step for using the module.

The binding element 9 is used with a parallelepiped pack P of sheets (FIG. 2) provided with overlapped through-holes 20 made along one larger side of each sheet.

Figure 3:
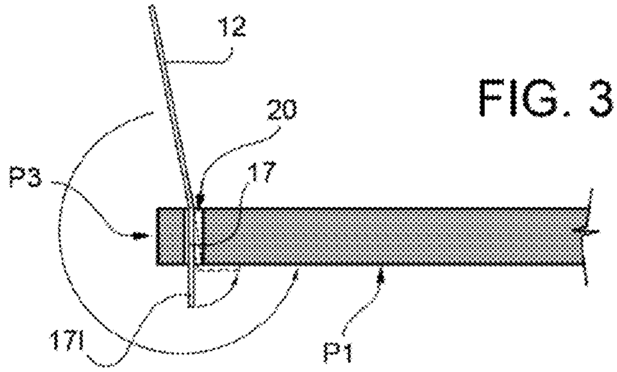
FIG. 3 shows a side plan view in enlarged scale, of a second step for using the module.

In particular (FIG. 3), the tabs 17 are inserted in respective through-holes 20 with an end 17-1 of the tabs 17 which protrudes from the holes and is folded (see the arrow in FIG. 3) and lying on a first face P-1 of the pack P.

Figure 4:
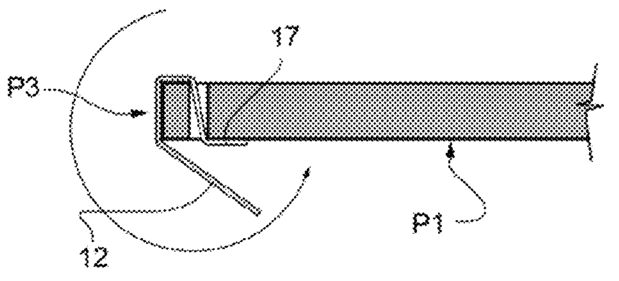
FIG. 4 shows a side plan view in enlarged scale, of a third step for using the module.
Figure 5:
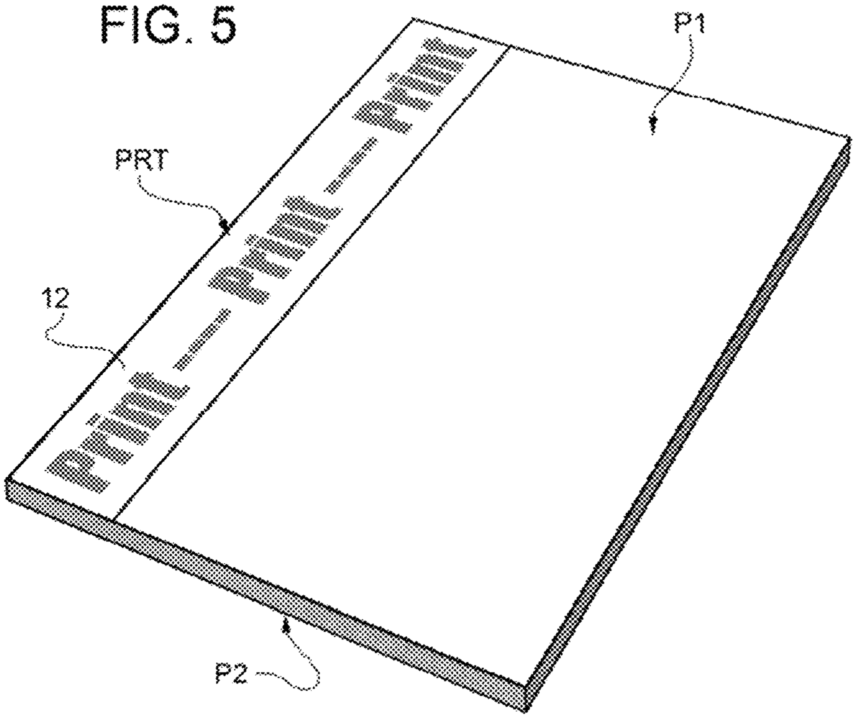
FIG. 5 shows a perspective view in enlarged scale, of a fourth step for using the module.

Then (FIG. 4), the rectangular element 12 is folded in a U (see the arrow in FIG. 4) so that it follows and replicates a face with smaller side P-3 of pack P and is arranged with the portion of second larger side thereof overlapped on the folded tabs 17 and stably connected with face P-1 by means of the adhesive. The adhesive of the tabs and of the rectangular element 12 forms an extremely strong connection.

Therefore, a bound booklet is made which keeps bound the sheet elements of pack P. The graphic signs PRT printed by the printer on the portion of larger side 12 face the outside of the bound booklet and contribute to identifying/making the bound booklet more pleasant.

Figure 6:
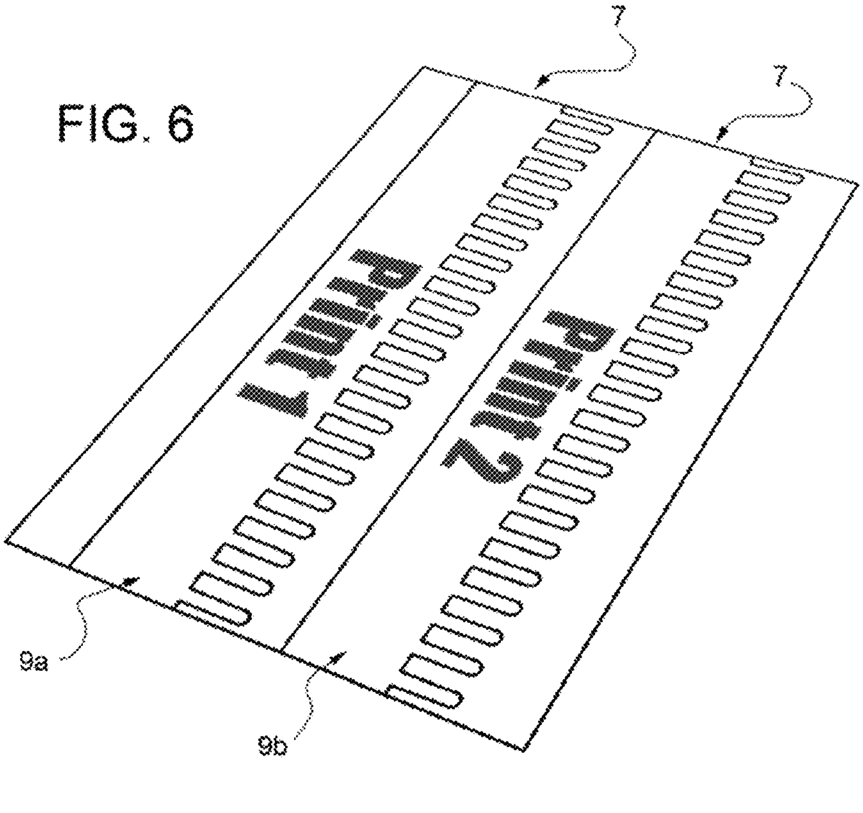
FIG. 6 shows a first variant of the printing module shown in FIG. 1.

According to a variant shown in FIG. 6, the preferential breaking lines delimit at least a first and a second binding element 9-*a* and 9-*b* arranged parallel to each other with respective first and second tabs which extend towards the same side of the rectangular element. Such an arrangement makes it easier to execute printing programs which are to print the signs PRT according to the same orientation.

Figure 7:
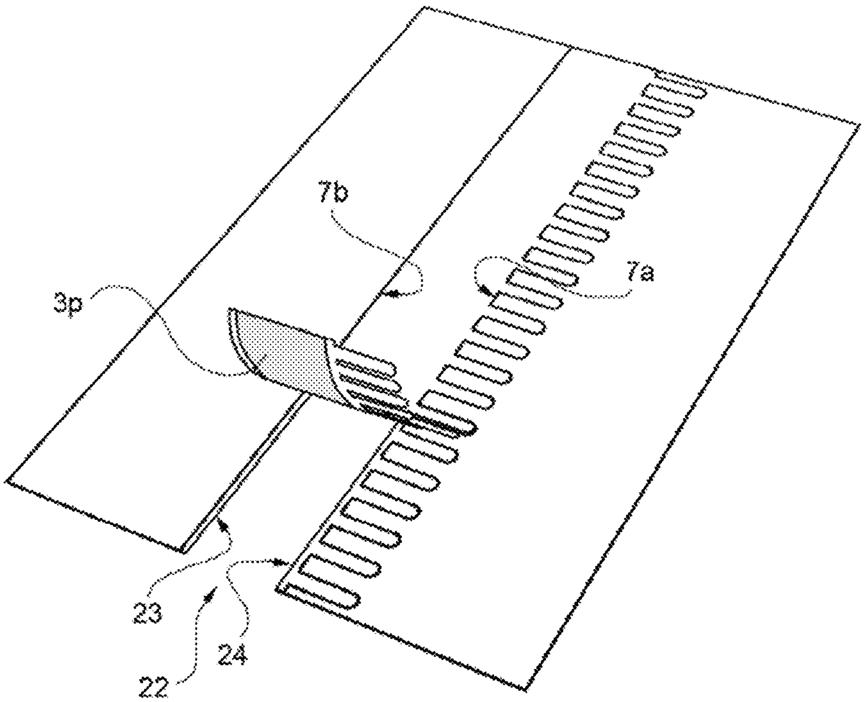
FIG. 7 shows a second variant of the printing module shown in FIG. 1.

According to the variant in FIG. 7, support 2 is also provided with further preferential breaking lines 22 adapted to delimit a support portion which remains glued to the rectangular element 12 as a result of the separation of the binding element) from support 2. The presence of such a support portion 3*p* facilitates the grip of the binding element. The support portion is then removed before performing the operations in FIG. 4.

In particular, the further preferential breaking lines 22 comprise:

a second rectilinear breaking line 23 which extends for the whole length of support 2 parallel to the first rectilinear line 7-*b* made in the self-adhesive element a third rectilinear breaking, line 24 which extends for the whole length of support 2 parallel to the rectilinear stretches of the second line 7-*a;* the support portion 3*p* which remains glued to the rectangular element 3*p* is delimited, on opposite sides, by the second and by the third line 23, 24.

Lastly, it is clear that modifications and variants may be made to the printing module described and illustrated herein without. departing from the scope of protection of the present invention.

The invention claimed is:

1. A printing module comprising a support and a self-adhesive sheet element having a first face coated with adhesive and arranged on said support and a second face configured for receiving signs by means of printing, said sheet element has preferential breaking lines which delimit a sheet binding element comprising:

a rectangular element;

a plurality of flexible tabs arranged as a comb which integrally extend along a first larger side of the rectangular element;

the binding element being separable from said support and being configured to be used with a pack of sheets provided with overlapped through-holes made along one side of each sheet;

said tabs being configured for being inserted in respective through-holes with an end of the tabs which protrudes from the holes themselves and is folded and lying on a first face of said pack;

said rectangular element configured to bind a booklet such that said rectangular element is arranged with at least a portion of a second larger side thereof opposite to the first side overlapped to said folded tabs and stably connected with said first face and with said tabs by means of said adhesive.

2. A printing module according to claim 1, wherein said preferential breaking lines comprise a first rectilinear line extending by the whole length of said self-adhesive element and delimits said second larger side and a second line formed by rectilinear line segments belonging to the first larger side and alternating U-shaped contours which delimit respective tabs.

3. A module according to claim 2, wherein said support is provided with further preferential breaking lines adapted to delimit a support portion which remains glued to the rectangular element as a result of the separation of the binding element from said support.

4. A module according to claim 3, wherein the further preferential breaking lines comprise:

a second rectilinear line which extends by the whole length of said support parallel to the first rectilinear line made in said self-adhesive element;

a third rectilinear line which extends by the whole length of said support parallel to said rectilinear line segments of the second line;

the support portion which remains glued to the rectangular element being delimited, on opposite sides, by the second and by the third line.

5. A module according to claim 1, wherein said preferential breaking lines delimit at least a first and a second binding element arranged parallel to each other with respective first and second tabs which extend towards the same side of said self-adhesive rectangular sheet element.

6. A printing module comprising a support and a self-adhesive sheet element having a first face coated with adhesive and arranged on said support and a second face configured for receiving signs by means of printing, said sheet element has preferential breaking lines which delimit a sheet binding element comprising:

a rectangular element;

a plurality of flexible tabs arranged as a comb which integrally extend along a first larger side of the rectangular element;

the sheet binding element being separable from said support and being configured to be used with a pack of sheets provided with overlapped through-holes made along one side of each sheet.

7. The printing module of claim 6, wherein said tabs are configured for being inserted in respective through-holes with an end of the tabs which protrudes from the holes themselves and is folded and lying on a first face of said pack.

8. The printing module of claim 7, wherein said rectangular element is configured to bind a booklet such that said rectangular element is arranged with at least a portion of a second larger side thereof opposite to the first side overlapped to said folded tabs and stably connected with said first face and with said tabs by means of said adhesive.

* * * * *